No. 807,409. PATENTED DEC. 12, 1905.
T. WHITAKER.
BRAKE FOR VELOCIPEDES AND OTHER ROAD VEHICLES.
APPLICATION FILED AUG. 21, 1902.
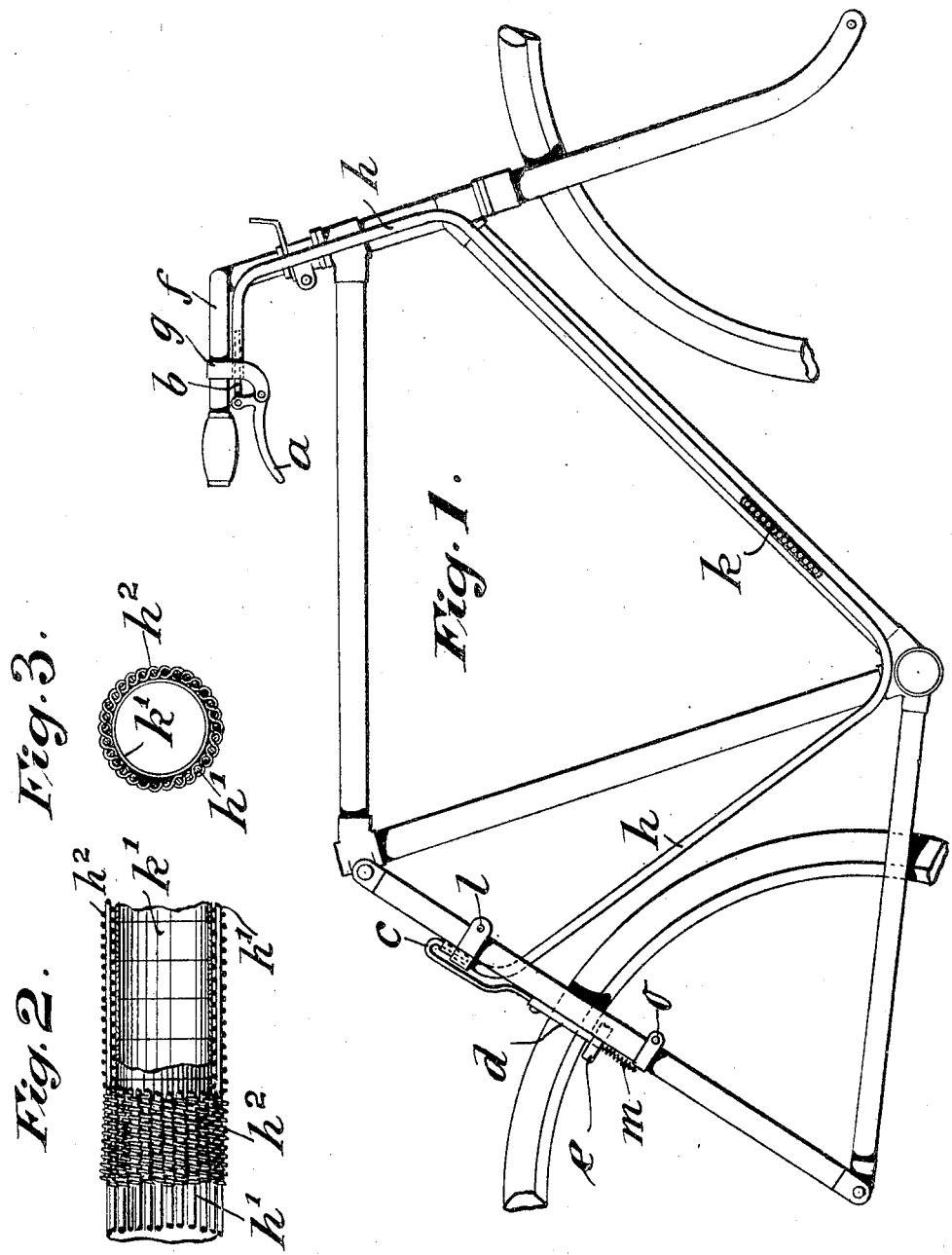
Witnesses:
Alfred Bosshardt
Stanley R. Bramall
Inventor.
Thomas Whitaker
Per J. Bosshardt,
Attorney.

UNITED STATES PATENT OFFICE.

THOMAS WHITAKER, OF CHEADLE HULME, ENGLAND, ASSIGNOR OF ONE-HALF TO THOMAS SLACK, OF STOCKPORT, ENGLAND.

BRAKE FOR VELOCIPEDES AND OTHER ROAD-VEHICLES.

No. 807,409.      Specification of Letters Patent.      Patented Dec. 12, 1905.

Application filed August 21, 1902. Serial No. 120,600.

*To all whom it may concern:*

Be it known that I, THOMAS WHITAKER, a subject of the King of Great Britain, residing at Cheadle Hulme, in the county of Chester, England, (whose post-office address is 28 Ack Lane, Cheadle Hulme aforesaid,) have invented new and useful Improvements in and Relating to Brakes for Velocipedes and other Road-Vehicles, (for which I have made application for patent in Great Britain, No. 3,954, dated February 17, 1902,) of which the following is a specification.

In brakes constructed in accordance with this invention for the mechanism between the lever or other operating device and the brake-block or equivalent mechanism I employ an inexpansible flexible tube or channel of such convenient shape that it will contain an incompressible but extensible flexible body of metal or other suitable material. The inside incompressible flexible body is so constructed that it will (lubricated, if desirable) slide along the inside of the tube when the same is straight or bent. The outer inexpansible tube acts as a guide to the incompressible flexible body inside it. Power is transmitted to the brake-blocks or their equivalents by the outer tube or channel being conveniently held, (preferably at both ends,) and the operating-lever or other device being so arranged that it will act by pressure on one end of the inner incompressible but extensible flexible body and by setting up a sliding movement of the inner body will actuate the brake-block mechanism or its equivalent at the other end of this inner body. The brake mechanism to be operated by this form of transmitting connection may be adapted to act on the tire of the wheel, on a drum on the wheel-axle, on the rim of the wheel, or any other suitable place on a velocipede or other road-vehicle, or the transmitting mechanism may be made to operate two or more brakes simultaneously. I attain these objects by the mechanism illustrated in the accompanying one sheet of drawings, in which—

Figure 1 is a side elevation of a bicycle provided with a brake constructed in accordance with my invention. Fig. 2 is partly an elevation and partly a longitudinal section; and Fig. 3, a cross-section, at an enlarged scale, of the guide-tube of the brake.

The operating mechanism consists of a hand-lever $a$, provided with a plunger $b$ and pivoted on a bracket $g$, secured to the handle-bar $f$.

The transmitting mechanism consists of the inexpansible inextensible flexible tube $h$, which is made flexible by being constructed of woven wire or any other convenient means. The said inexpansible inextensible flexible tube may consist of a number of strands $h'$, interwoven by a wire $h^2$ of about half the thickness of the said strands, as shown in Figs. 2 and 3. The interior of the said tube may be lined with segmental bushes $k'$ to prevent the inner body $k$ wearing the tube and at the same time add to its inextensibility. This tube is held by suitable brackets $g$ and $l$ and contains an inner body $k$, consisting of balls or segments of metal or other incompressible substance in close contact, or in place of the balls or segments a spiral-wound wire with the spirals in close contact may be used. One end of the inner body $k$ consists of a suitably-shaped rod $c$, arranged to slide in the flexible tube and to protrude from it. This rod $c$ is connected to the brake mechanism which it puts "on" when the plunger $b$ is pressed against the other end of the inner body $k$. The brake mechanism is brought "off" by means of a spring or springs when the plunger is $b$ released. In the drawings the rod $c$ is shown connected to a horseshoe-shaped piece $d$ at the one end and has the other end resting on the inner body $k$. The horseshoe $d$ encircles the rim of the wheel and has friction-blocks $e$ attached to it, which when lifted press on the rim of the wheel at either side. There is a spring $m$ on either side of the wheel to release the brake and a clip $o$ to fix each spring $m$.

The power is transmitted from the hand-lever $a$ by means of the rod or plunger $b$, which presses on the inner body $k$ and causes it to slide along the inside of the tube $h$, thus lifting the horseshoe $d$ by the rod $c$ and causing the blocks $e$ to press on the rim of the wheel at either side.

I may remark that the construction of the guide-tube itself is old, and therefore do not claim such broadly; but

What I claim as my invention, and desire to secure by Letters Patent, is—

In a back brake for velocipedes and other vehicles, a tube at the side of the vehicle-frame, constructed of woven wire and one end of which is secured to the handle-bar and the other to the back fork, a series of longitudinally-movable incompressible balls in the said tube, the said tube being inexpansible to resist the lateral pressure of the said balls and flexible to accommodate itself in steering to the various positions of the handle-bar, a plunger in one and a sliding rod connected with the back brake in the other end of the said tube bearing against the respective ends of the said ball series and means for operating the said plunger and thereby exert pressure upon the said balls, all combined substantially as and for the purpose set forth.

In witness whereof I have hereunto set my hand in presence of two witnesses.

THOMAS WHITAKER.

Witnesses:
ALFRED BOSSHARDT,
STANLEY E. BRAINALL.